L. A. BELLIS.
VALVE.
APPLICATION FILED DEC. 3, 1912.

1,090,676.

Patented Mar. 17, 1914.

Witnesses
P. M. Hunt
D. H. Gould

Inventor
L. A. Bellis.
By Victor J. Evans.
Attorney

UNITED STATES PATENT OFFICE.

LEWIS A. BELLIS, OF DOUGLAS, ARIZONA.

VALVE.

1,090,676.  Specification of Letters Patent.  Patented Mar. 17, 1914.

Application filed December 3, 1912. Serial No. 734,736.

*To all whom it may concern:*

Be it known that I, LEWIS A. BELLIS, a citizen of the United States, residing at Douglas, in the county of Cochise and State of Arizona, have invented new and useful Improvements in Valves, of which the following is a specification.

This invention relates to an improvement in valve structures for water glass gages, comprehending specifically a structure in which the valve will automatically seat itself in the event of breakage of the glass tube to prevent steam or water escaping through such breakage.

The main object of the present invention is the provision of a valve to maintain an open position by the engagement therewith of the terminal of the tube, the valve being further held against possibility of complete separation from the valve seat in order to expedite the replacement of the tube when broken.

The invention in its preferred form of details will be described in the following specification, reference being had to the accompanying drawings, in which:—

Figure 1:
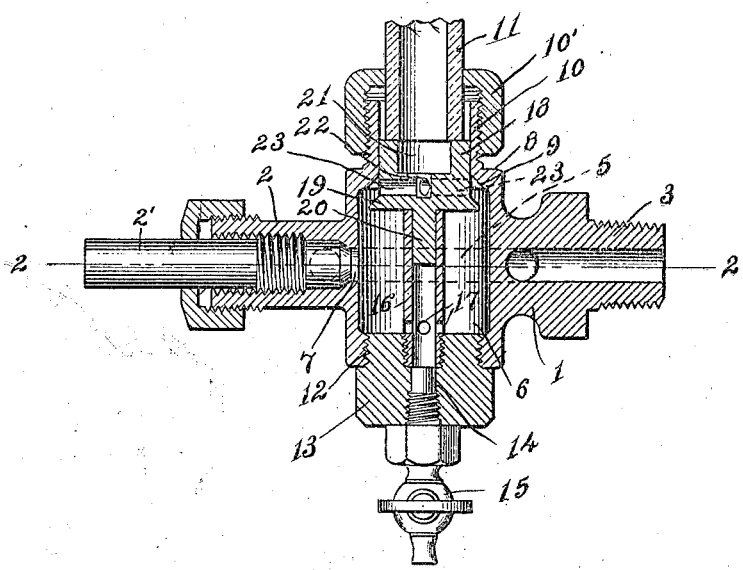
Figure 2:
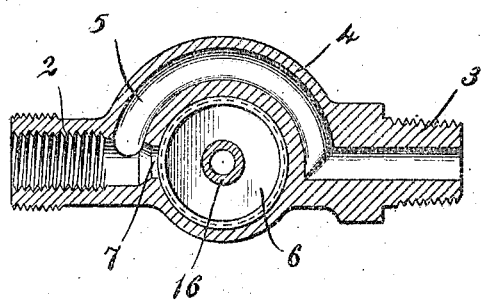

Figure 1 is a vertical section illustrating the improvement, a portion only of the glass tube being shown. Fig. 2 is a horizontal section on the line 2—2 of Fig. 1.

Referring particularly to the accompanying drawings, the improved valve comprises a body 1 of any appropriate material open at the upper and lower ends and having lateral projections 2 and 3 one of which as 2 is formed to receive an appropriate valve plug 2' and the other as 3 formed to permit connection of the usual steam pipe, with which parts, as also with the particular shape or material of the body 1 aside from the details hereinafter noted, the present invention is not concerned, and I contemplate any desired arrangement or construction of such parts. The body 1 is formed with a lateral offset 4 cored to provide a conduit 5 connecting the bores of the sections 2 and 3 around the valve body, so that the steam or water to and from the gage valve has an open passage around the valve body. The interior of the valve body is shaped to form a main chamber 6 and this chamber is through an opening 7 in direct open communication with the inlet side of the valve. The upper end of the valve body has an inwardly extending wall 8 providing within the chamber 6 a lateral surface of sufficient extent to permit the formation therein of a valve seat 9. An exteriorly threaded extension 10 extends upwardly from the wall 8 to provide for the connection of the usual gland 10' to encircle and hold the ordinary glass tube 11. The opening in the lower end of the body 1 is interiorly threaded at 12 for the reception of the plug 13, said plug being formed with a central longitudinal bore 14 threaded at one end to receive the usual pet cock 15 and interiorly threaded at the opposite end to receive a valve guide 16, which guide is in the form of a sleeve-like member open at both ends and threaded into and secured to the plug 13, the valve guide rising centrally of the chamber 6 and terminating at its upper end and at a point below the upper end of the chamber. The valve guide is adjacent its lower end formed with a series of openings 17 to establish communication between the interior of the guide and the chamber 6, for a purpose which will later appear.

The valve comprises a cylindrical body 18 of a size to slidably fit within the extension 10, being formed at its lower end with a valve extension 19 to coöperate with the seat 9. The valve has a central depending stem 20 arranged to slidably fit in and close the upper end of the valve guide 16. The upper portion of the valve body is cored out to present a pressure space 21, and also formed with a vertically extending centrally disposed depression 22 in communication with the pressure space 21 and also with radially arranged ports 23 which extend laterally through the valve body.

The parts are so arranged that when the valve body is at its limit of open movement the ports 23 will establish communication between the pressure space 21 of the valve body and the chamber 6. It is of course to be understood that a similar valve may be used at the opposite or upper end of the gage tube, though in this instance the pet cock will preferably be omitted as it is not necessary.

In the use of the device it will be noted that with the parts assembled as described, the gage tube 11 operates to hold the valve open so that communication is established between the interior of said tube and the inlet pipe through the opening 7, chamber 6, ports 23, depression 22, and space 21. If, however, the glass tube should become broken, the pressure in the chamber 6 will operate to immediately close the valve, preventing the escape of water or steam through the broken gage tube. The usual clean-out operation can be carried out whenever necessary by simply opening the pet cock as the glass gage can then be readily blown out through the openings 17, and in this operation it will be obvious that the valve proper is held against possibility of accidental complete separation from the valve seat by reason of the guide tube 16 and the projection 20 from the valve.

What is claimed is:—

1. A water glass gage valve including a body formed to provide a chamber and formed with a valve seat, a valve arranged to coöperate with the seat and formed to establish communication between opposite sides of the valve when the valve is open, means for holding the valve against more than a predetermined movement in a direction from its seat, a glass gage, the glass gage holding the valve in fixed coöperation with such means, whereby the valve is fixed against movement in either direction while said glass gage remains intact.

2. A water gage valve including a body formed with a chamber, a glass gage, a hollow valve guide arranged in the chamber, a valve operative in the chamber to control communication between the chamber and the glass gage, said valve being slidably mounted in the guide and held against more than a predetermined movement by said guide, the end of the valve opposite the guide connection being formed to contact with the end of the glass gage, said valve guide being formed with openings to establish communication between the interior of said guide and the chamber.

In testimony whereof I affix my signature in presence of two witnesses.

LEWIS A. BELLIS.

Witnesses:
 H. C. BEUMLER,
 C. M. HADDEN.